US009257237B2

(12) United States Patent
Okada

(10) Patent No.: US 9,257,237 B2
(45) Date of Patent: Feb. 9, 2016

(54) DYE-SENSITIZED SOLAR CELL MODULE AND MANUFACTURING METHOD FOR SAME

(71) Applicant: Kenichi Okada, Sakura (JP)

(72) Inventor: Kenichi Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 13/649,530

(22) Filed: Oct. 11, 2012

(65) Prior Publication Data

US 2013/0032193 A1 Feb. 7, 2013

Related U.S. Application Data

(63) Continuation of application No. PCT/JP2011/058760, filed on Apr. 7, 2011.

(30) Foreign Application Priority Data

Apr. 13, 2010 (JP) ................................ 2010-092686

(51) Int. Cl.
*H01L 31/18* (2006.01)
*H01L 31/042* (2014.01)
*H01G 9/20* (2006.01)

(52) U.S. Cl.
CPC .......... *H01G 9/2081* (2013.01); *H01G 9/2022* (2013.01); *H01G 9/2031* (2013.01); *H01G 9/2059* (2013.01); *Y02E 10/542* (2013.01)

(58) Field of Classification Search
CPC . H01G 9/2081; H01G 9/2095; H01G 9/2068; H01G 9/2022; H01G 9/2077
USPC ........................................... 136/244; 438/80
See application file for complete search history.

(56) References Cited

U.S. PATENT DOCUMENTS

2003/0140959 A1* 7/2003 Gaudiana et al. ............. 136/244
2007/0006917 A1* 1/2007 Gonda et al. .................. 136/263
(Continued)

FOREIGN PATENT DOCUMENTS

JP        2005-346971 A    12/2005
JP        2005346971 A  * 12/2005      ............ H01M 14/00
(Continued)

OTHER PUBLICATIONS

Japanese Office Action issued Nov. 26, 2013 in Japanese Patent Application No. 2010-092686.
(Continued)

*Primary Examiner* — Jonathan Johnson
*Assistant Examiner* — Bethany L Martin
(74) *Attorney, Agent, or Firm* — Sughrue Mion, PLLC

(57) ABSTRACT

The present invention is a dye-sensitized solar cell module provided with a pair of mutually opposed electrodes, partitions that connect the pair of electrodes and form a plurality of cell spaces together with the pair of electrodes, and an electrolyte filled into the cell spaces, wherein one electrode of the pair of electrodes has oxide semiconductor portions that face each of the plurality of cell spaces and are loaded with a photosensitizing dye, at least one electrode of the pair of electrodes is composed of at least two layers, the thickest layer is a metal substrate having a thickness of 100 μm or less or a resin film having a thickness of 500 μm or less, and the electrode containing the metal substrate or the resin film has a bending portion that bends so as to protrude towards the opposing electrode.

3 Claims, 15 Drawing Sheets

(56) References Cited

U.S. PATENT DOCUMENTS

| | | | |
|---|---|---|---|
| 2008/0308155 A1* | 12/2008 | Fukui et al. | 136/261 |
| 2009/0000661 A1* | 1/2009 | Yoshimoto et al. | 136/256 |
| 2009/0126784 A1* | 5/2009 | Pak et al. | 136/256 |
| 2009/0272433 A1* | 11/2009 | Morooka et al. | 136/256 |
| 2010/0101648 A1 | 4/2010 | Morooka et al. | |
| 2010/0229941 A1 | 9/2010 | Matsui et al. | |
| 2010/0229949 A1* | 9/2010 | Yamamoto et al. | 136/261 |
| 2011/0126905 A1* | 6/2011 | Yang et al. | 136/261 |

FOREIGN PATENT DOCUMENTS

| | | |
|---|---|---|
| JP | 2008-147037 A | 6/2008 |
| JP | 2008-153180 A | 7/2008 |
| JP | 2009-099476 A | 5/2009 |
| JP | 2009-289735 A | 12/2009 |
| JP | 2009-289736 A | 12/2009 |
| JP | 2009-289737 A | 12/2009 |
| JP | 2010-003615 A | 1/2010 |
| JP | 2010-033815 A | 2/2010 |
| WO | WO 2009/050995 A1 | 4/2009 |
| WO | WO 2009/069551 A1 | 6/2009 |
| WO | 2009/133688 A1 | 11/2009 |
| WO | 2009/133689 A1 | 11/2009 |
| WO | 2009/141964 A1 | 11/2009 |

OTHER PUBLICATIONS

Supplementary European Search Report dated Aug. 28, 2013 issued in a corresponding European Patent Application No. 11 76 8711.5.

* cited by examiner

DYE-SENSITIZED SOLAR CELL MODULE AND MANUFACTURING METHOD FOR SAME

CROSS REFERENCE TO RELATED APPLICATIONS

This application is a Continuation of National Stage of International Application No. PCT/JP2011/58760 filed Apr. 7, 2011, claiming priority based on Japanese Patent Application No. 2010-092686 filed Apr. 13, 2010, the contents of all of which are incorporated herein by reference in their entirety.

TECHNICAL FIELD

The present invention relates to a dye-sensitized solar cell module and a manufacturing method therefor.

BACKGROUND ART

Dye-sensitized solar cell modules are attracting attention for use as photoelectric conversion elements since they allow the obtaining of high photoelectric conversion efficiency at low cost, and various studies have been conducted on the development of these dye-sensitized solar cell modules.

Dye-sensitized solar cell modules typically are provided with a working electrode, counter electrode, photosensitizing dye loaded on the working electrode, partitions that divide the space between the working electrode and counter electrode into a plurality of cell spaces, and an electrolyte arranged in each of the cell spaces.

As such a dye-sensitized solar cell module, a dye-sensitized solar cell module obtained by, for example, superimposing a working electrode and counter electrode with encapsulating materials serving as partitions and an electrolyte interposed between the working electrode and the counter electrode at atmospheric pressure or lower and at a pressure equal to or lower than the vapor pressure of the electrolyte and then adhering with the encapsulating materials is known (Patent Document 1).

PRIOR ART DOCUMENTS

Patent Documents

Patent Document 1: Japanese Patent Application Laid-open No. 2009-99476

SUMMARY OF THE INVENTION

Problems to be Solved by the Invention

According to the dye-sensitized solar cell module described in the above-mentioned Patent Document 1, the following effects are typically expected. Namely, since the cell spaces between the working electrode and the counter electrode are depressurized, the working electrode and the counter electrode are bent so as to protrude toward their respective opposing electrode. Consequently, the distance between the working electrode and the counter electrode decreases, and photoelectric conversion efficiency improves due to shortening of distance between electrodes.

However, the dye-sensitized solar cell module described in the above-mentioned Patent Document 1 has the problems indicated below.

Namely, in the dye-sensitized solar cell module described in Patent Document 1, photoelectric conversion efficiency decreases considerably with the passage of time. Namely, there was a problem of an increase in the rate of decrease in photoelectric conversion efficiency. This is a particularly serious problem in the dye-sensitized solar cell modules containing a plurality of cell spaces between the working electrode and the counter electrode. Namely, in the case a plurality of cells are connected in series in particular, there is the risk of the problem of an increase in the rate of decrease of photoelectric conversion efficiency in a single cell preventing the entire module from being used, thereby resulting in the risk of impaired reliability of the dye-sensitized solar cell module.

With the foregoing in view, an object of the present invention is to provide a highly reliable dye-sensitized solar cell module and a manufacturing method therefor.

Means for Solving the Problems

The inventor of the present invention examined the cause of the above-mentioned problems. As a result, it was found that electrodes having a thickness of 1 mm or more were used for the working electrode and the counter electrode in the dye-sensitized solar cell module of Patent Document 1, and this was thought to be the cause of the problems. Namely, if the working electrode and the counter electrode are excessively thick, in the case the working electrode and counter electrode have bent, force acts on the bent electrodes in a direction that returns them to their original shape, resulting in the occurrence of a phenomenon known as spring back. Consequently, force constantly acts on the counter electrode and the working electrode in a direction that increases the distance between the electrodes, and as a result thereof, the working electrode and counter electrode move apart resulting in vaporization of the electrolyte, or due to this force acting in a direction that increases distance between electrodes, encapsulation and the like are disrupted resulting in leakage of electrolyte. In addition, even if the electrolyte is not vaporized or encapsulation and the like is not disrupted, as a result of the distance between electrodes increasing, resistance increases and photoelectric conversion efficiency ends up decreasing. Thus, the inventor of the present invention thought that the rate of decrease in photoelectric conversion efficiency would increase. Therefore, as a result of conducting further extensive studies, the inventor of the present invention found that the above-mentioned problems can be solved in the case at least one of the electrodes of the pair of opposing electrodes is composed of at least two layers, and the thickest layer is a metal substrate or resin film of a prescribed thickness, thereby leading to completion of the present invention.

Namely, the present invention is a dye-sensitized solar cell module provided with a pair of mutually opposed electrodes; partitions that connect the pair of electrodes and form a plurality of cell spaces together with the pair of electrodes; and an electrolyte to be filled into the cell spaces, wherein one of the pair of electrodes has oxide semiconductor portions that face the plurality of cell spaces respectively and are loaded with a photosensitizing dye, at least one electrode of the pair of electrodes is composed of at least two layers, the thickest layer being a metal substrate having a thickness of 100 μm or less or a resin film having a thickness of 500 μm or less, and the electrode containing the metal substrate or the resin film has a bending portion that bends so as to protrude towards the opposing electrode.

In this dye-sensitized solar cell module, the electrode that contains a metal substrate having a thickness of 100 μm or less or a resin film having a thickness of 500 μm or less as the thickest layer of at least two layers has a bending portion that bends so as to protrude towards the opposing electrode, and in this bending portion, susceptibility to the occurrence of spring back is considerably reduced. Consequently, according to this dye-sensitized solar cell module, in the bending portion of the electrode that has the bending portion, excessive force resulting from spring back phenomenon is unlikely to act in a direction that causes an increase in the distance between the pair of electrodes. In addition, leakage of electrolyte due to disruption of encapsulation caused by force acting in a direction that causes an increase in the distance between electrodes is also adequately inhibited. Moreover, since the electrode having the metal substrate or the resin film has flexibility, even if internal pressure within the cell spaces increases due to an electrical potential abnormality and the like, since the flexible electrode is able to bend in response thereto, stress generated at the interface between the partitions and electrodes can be alleviated by the flexible electrode. As a result, the rate of decrease in photoelectric conversion efficiency can be adequately reduced. In addition, since the metal substrate and the resin film are less susceptible to excessive force resulting from spring back phenomenon acting in a direction that causes an increase in the distance between the pair of electrodes, there is less likelihood of an increase in distance between electrodes. Consequently, increases in resistance can be adequately inhibited, and decreases in photoelectric conversion efficiency can be adequately inhibited. Thus, according to the present invention, a highly reliable dye-sensitized solar cell module can be realized.

In the above-mentioned dye-sensitized solar cell module, at least two of the plurality of cells formed by the cell spaces, the partitions and the pair of electrodes are preferably connected in parallel.

In this case, even if the rate of decrease in photoelectric conversion efficiency increases in a portion of the cells connected in parallel, as long as the rate of decrease in photoelectric conversion efficiency is sufficiently low in the remaining cells, the dye-sensitized solar cell module can continue to be used without problems overall. Consequently, in comparison with the case of all of the cells being connected in series, reliability of the dye-sensitized solar cell module can be further enhanced.

In the above-mentioned dye-sensitized solar cell module, it is preferable that at least one electrode of the pair of electrodes has a wiring portion containing current collector wiring, and that the wiring portion is provided so as to overlap the partitions.

In this case, the wiring portion that contains the current collector wiring does not generate electricity. Consequently, if the wiring portion containing the current collector wiring is provided so as to overlap the partitions, it is possible to increase the light receiving surface area of the oxide semiconductor portions and further increase aperture ratio.

In the above-mentioned dye-sensitized solar cell module, it is preferable that one electrode of the pair of electrodes contains the metal substrate or the resin film, while the other electrode of the pair of electrodes does not contain the metal substrate or the resin film, and the other electrode of the pair of electrodes has a plurality of oxide semiconductor portions.

In this case, flexibility of the other electrode is less than that of the one electrode. Consequently, even if the other electrode has oxide semiconductor portions, there is no concern over the occurrence of cracking and the like caused by bending in the oxide semiconductor portions.

In the above-mentioned dye-sensitized solar cell module, it is preferable that the electrode containing the metal substrate or the resin film has a continuous electrically conductive portion provided on the metal substrate or the resin film so as to contact the plurality of cell spaces.

In this case, it is no longer necessary to connect adjacent cells with lead wires and the like for connecting the adjacent cells in parallel. In addition, the electrode containing the metal substrate or the resin film is remarkably less susceptible to the occurrence of spring back phenomenon. Consequently, a decrease in photoelectric conversion efficiency as a result of an effect given on all cells connected in parallel due to spring back phenomenon in the electrode containing the metal substrate or the resin film in the case in which adjacent cells are connected in parallel is more adequately inhibited.

In addition, the present invention is a manufacturing method for a dye-sensitized solar cell module comprising a preparation step for preparing a pair of electrodes, a partition forming portion fixing step for fixing partition forming portions on at least one of the pair of electrodes, and a lamination step for laminating the pair of electrodes through the partition forming portions under reduced pressure, and forming partitions that form a plurality of cell spaces together with the pair of electrodes between the pair of electrodes, wherein one electrode of the pair of electrodes has a plurality of oxide semiconductor portions respectively facing the plurality of cell spaces, a dye loading step for loading a photosensitizing dye onto the oxide semiconductor portions is contained between the preparation step and the partition forming portion fixing step, at least one electrode of the pair of electrodes is composed of at least two layers, the thickest layer is a metal substrate having a thickness of 100 μm or less or a resin film having a thickness of 500 μm or less, and in the lamination step, the pair of electrodes are laminated so that a bending portion that bends so as to protrude towards the opposing electrode is formed in the electrode containing the metal substrate or the resin film.

According to this manufacturing method for a dye-sensitized solar cell module, a highly reliable dye-sensitized solar cell module can be manufactured.

In addition, in the above-mentioned manufacturing method for a dye-sensitized solar cell module, it is preferable that at least one electrode of the pair of electrodes has a wiring portion containing the current collector wiring, the partitions contain a thermoplastic resin, and in the lamination step, the partitions are formed so as to overlap the wiring portion.

In this case, a dye-sensitized solar cell module can be manufactured that is capable of further increasing aperture ratio.

The thickness of the metal substrate is preferably 5 μm to 40 μm. In this case, the rate of decrease in photoelectric conversion efficiency can be effectively reduced. Thus, a more highly reliable dye-sensitized solar cell module can be obtained.

Moreover, it is preferable that the metal substrate is composed of at least one type of metal selected from the group consisting of titanium, nickel, stainless steel and platinum, and the electrolyte contains iodine.

Since the above-mentioned metals have corrosion resistance with respect to iodine in particular, they are particularly preferable in the case the electrolyte contains iodine.

Effects of the Invention

According to the present invention, a highly reliable dye-sensitized solar cell module, and a manufacturing method therefor, are provided.

MODES FOR CARRYING OUT THE INVENTION

Figure 1:
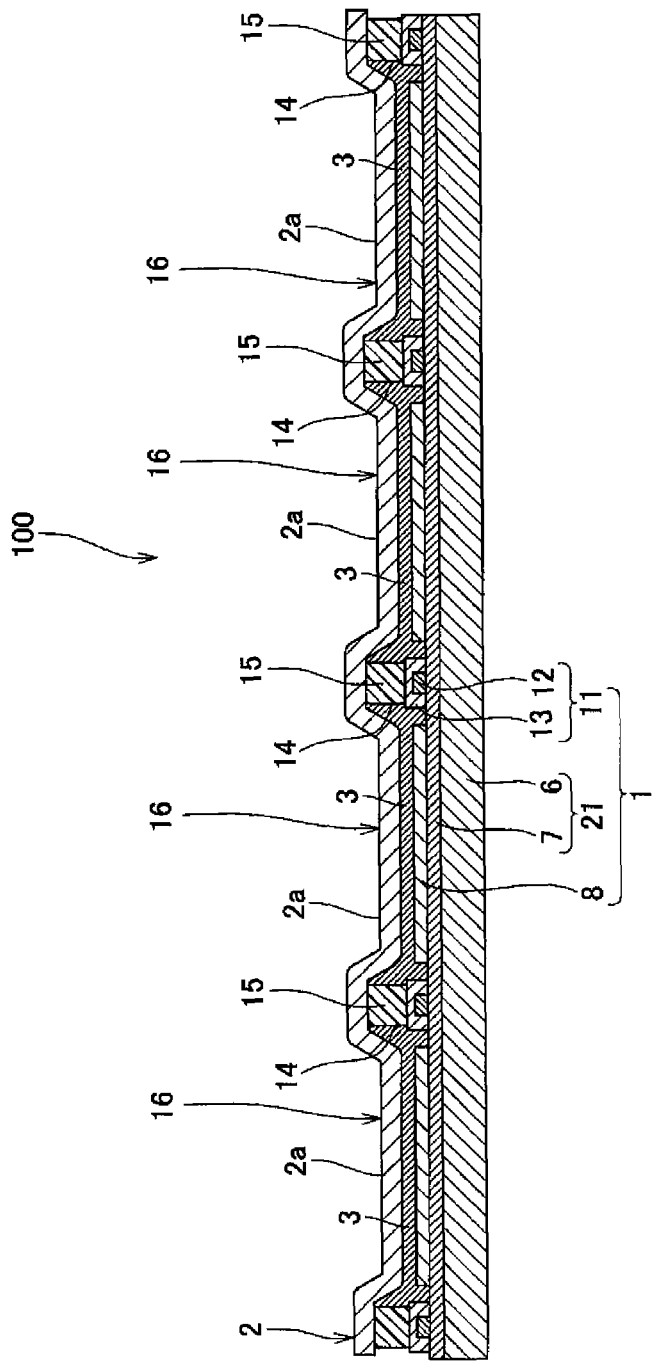
FIG. 1 is a cross-sectional view showing an embodiment of a dye-sensitized solar cell module of the present invention.

The following provides a detailed explanation of embodiments of the present invention while referring to the drawings. Furthermore, in all of the drawings, the same reference numerals are used to indicate constituents that are identical or equivalent, and duplicate explanations thereof are omitted.

FIG. 1 is a cross-sectional view showing a preferred embodiment of a dye-sensitized solar cell module according to the present invention. As shown in FIG. 1, a dye-sensitized solar cell module 100 is provided with a working electrode 1, and a counter electrode 2 arranged in opposition to the working electrode 1. The working electrode 1 is provided with a transparent electrically conductive electrode 21, a plurality of porous oxide semiconductor layers 8 provided on the surface of the transparent electrically conductive electrode 21, and a lattice-like wiring portion 11 arranged so as to surround the plurality of porous oxide semiconductor layers 8. The plurality of porous oxide semiconductor layers 8 are arranged to be mutually separated on a transparent electrically conductive film 7. A photosensitizing dye is loaded onto each of the plurality of porous oxide semiconductor layers 8.

The transparent electrically conductive electrode 21 has a transparent substrate 6 and the transparent electrically conductive film 7 in the form of a single continuous film provided on the transparent substrate 6 on the side of the counter electrode 2. The wiring portion 11 has current collector wiring 12 provided in contact with the transparent electrically conductive film 7, and a wiring protective layer 13 that covers the current collector wiring 12. Lattice-like partitions 15 that form a plurality of cell spaces 14 together with the working electrode 1 and the counter electrode 2 are provided between the working electrode 1 and the counter electrode 2. The partitions 15 connects the working electrode 1 and the counter electrode 2 and are arranged so as to overlap the wiring portion 11 containing the current collector wiring 12. Here, the partitions 15 are insulating, and a plurality of cells 16 formed by each of the cell spaces 14, the working electrode 1 and the counter electrode 2 are mutually connected in parallel. Each of the plurality of cell spaces 14 formed by the partitions 15 is filled with an electrolyte 3. Furthermore, the above-mentioned electrically conductive film 7 faces all of the plurality of cell spaces 14.

Figure 4:
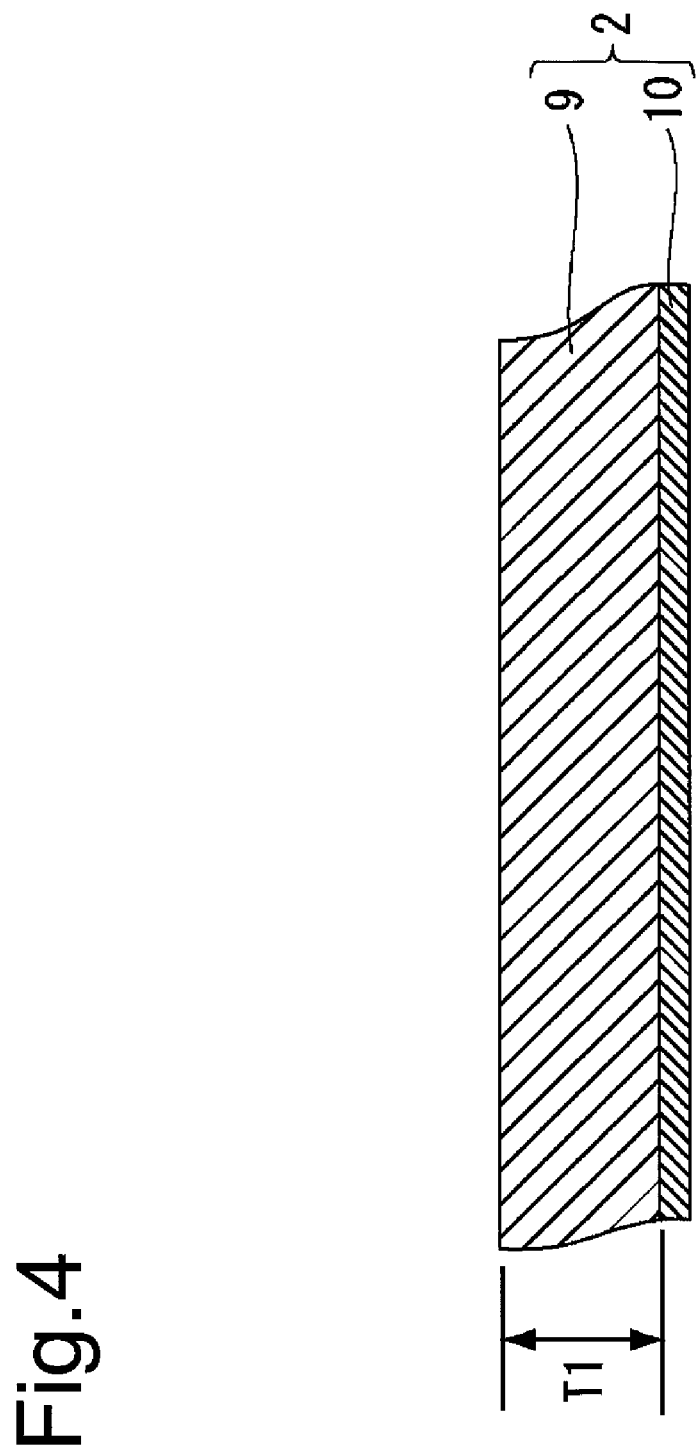
FIG. 4 is a partially enlarged cross-sectional view of FIG. 3.

The counter electrode 2 is composed of a metal substrate 9 and a catalyst film 10 provided thereon at a location in contact with the electrolyte 3 (see FIG. 4). The metal substrate 9 is arranged on the catalyst film 10 on the opposite side from the electrolyte 3. Here, a thickness T1 of the metal substrate 9 is greater than the thickness of the catalyst film 10. Namely, the metal substrate 9 is the thickest layer among the layers that compose the counter electrode 2. More specifically, the thickness of the metal substrate 9 is greater than the thickness of the catalyst film 10 and has the thickness T1 of 100 μm or less. The counter electrode 2 has a bending portion 2a that bends so as to protrude towards the opposing working electrode 1. The bending portion 2a is formed at locations corresponding to the plurality of cell spaces 14.

In this dye-sensitized solar cell module 100, the metal substrate 9, which is the thickest layer among the metal substrate 9 and the catalyst film 10 that compose the counter electrode 2, has a thickness of 100 μm or less. Consequently, the bending portion 2a of the counter electrode 2 is remarkably resistant to the occurrence of spring back. In addition, since the working electrode 1 does not have a bending portion, there is hardly any occurrence of spring back phenomenon therein. Consequently, according to this dye-sensitized solar cell module 100, there is little likelihood of excessive force attributable to spring back phenomenon acting in a direction that causes an increase in distance between the counter electrode 2 and the working electrode 1 in the counter electrode 2. In addition, leakage of the electrolyte 3 attributable to disruption of encapsulation caused by force acting in a direction that increases the distance between the electrodes is also adequately inhibited. In addition, since the counter electrode 2 having the above-mentioned metal substrate 9 has flexibility, even if there is an increase in internal pressure in the cell spaces 14 due to an electrical potential abnormality and the like, the bending portion 2a of the counter electrode 2 is able to bend, and stress generated at the interface between the partitions 15 and the counter electrode 2 or the working electrode 1 can be alleviated by the counter electrode 2. As a result, the rate of decrease in photoelectric conversion efficiency can be adequately reduced. In addition, since there is little likelihood of excessive force attributable to spring back phenomenon acting in a direction that causes an increase in the distance between the working electrode 1 and the counter electrode 2 in the metal substrate 9, distance between the electrodes does not easily increase. Consequently, increases in resistance are adequately inhibited, and decreases in photoelectric conversion efficiency can be adequately inhibited. Thus, a highly reliable dye-sensitized solar cell module 100 can be realized.

Moreover, in the dye-sensitized solar cell module 100, the wiring portion 11 that contains the current collector wiring 12 does not generate electricity. With respect to this point, in the dye-sensitized solar cell module 100 of the present embodiment, since the wiring portion 11 containing the current collector wiring 12 is provided so as to overlap the partitions 15, the light receiving surface area of the porous oxide semiconductor layers 8 can be increased, thereby further increasing aperture ratio.

In addition, in the dye-sensitized solar cell module 100, the plurality of cells 16 formed by the cell spaces 14, the partitions 15, the counter electrode 2 and the working electrode 1 are connected in parallel. Consequently, even if the rate of decrease in photoelectric conversion efficiency has increased in a portion of the cells 16 connected in parallel, as long as the rate of decrease in photoelectric conversion efficiency is adequately low in the remaining cells 16, the dye-sensitized solar cell module 100 can continue to be used without problems overall. Consequently, in comparison with the case in which all of the plurality of cells 16 is connected in series, the reliability of the dye-sensitized solar cell module 100 can be further enhanced.

Moreover, in the dye-sensitized solar cell module 100, the catalyst film 10 provided so as to cover the plurality of cell spaces 14 is in the form of a single, continuous film. In general, if spring back phenomenon occurs in this case, there is the risk of an increase in the rate of decrease in photoelectric conversion efficiency in all of the cell spaces 14 connected in parallel. With respect to this point, in the dye-sensitized solar cell module 100, the counter electrode 2 containing the catalyst film 10 has the metal substrate 9 having a thickness of 100 μm or less, thereby increasing resistance to the occurrence of spring back phenomenon. Consequently, the possibility of a decrease in the rate of decrease in photoelectric conversion efficiency occurring in all of the plurality of cell spaces 14 can be adequately lowered. In addition, it is no longer necessary to connect adjacent cells 16 with lead wires and the like in order to connect in parallel.

Next, an explanation is provided for a manufacturing method for the dye-sensitized solar cell module 100 described above.

[Preparation Step]

First, the working electrode 1 and the counter electrode 2 are prepared in the manner described below.

(Working Electrode)

Figure 2:
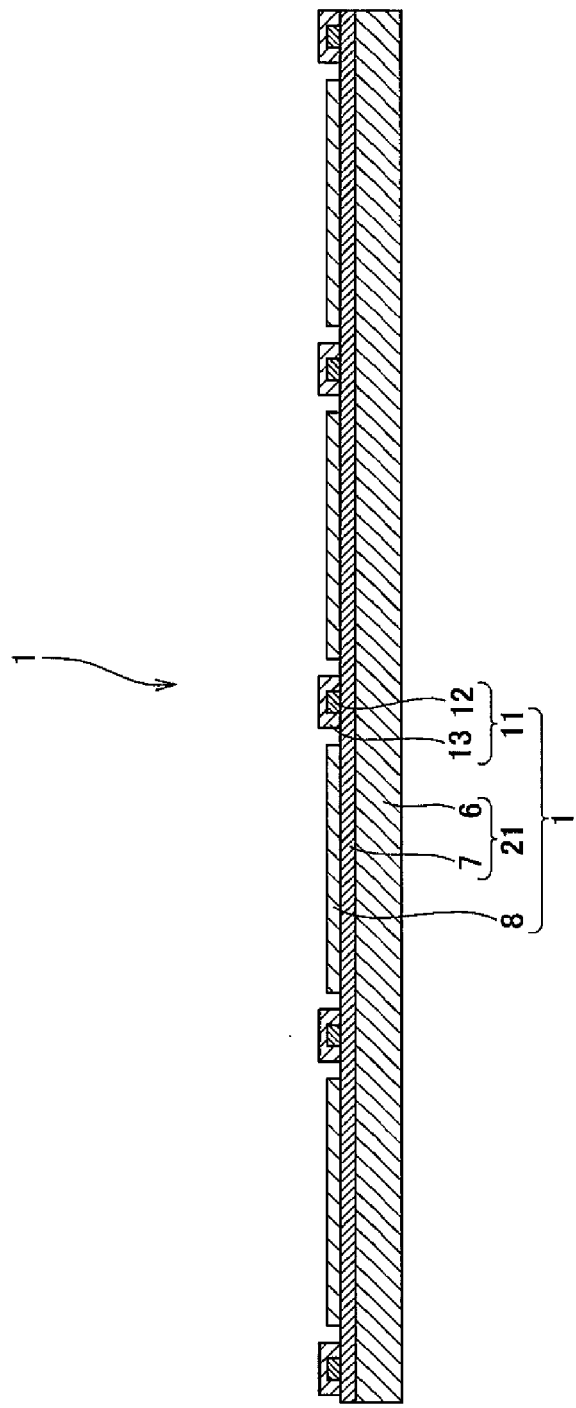
FIG. 2 is a cross-sectional view showing one of a pair of electrodes used in a manufacturing method for the dye-sensitized solar cell module of FIG. 1.

First, the transparent electrically conductive electrode 21 is prepared. The transparent electrically conductive electrode 21 can be obtained by forming the single, continuous transparent electrically conductive film 7 on the transparent substrate 6 (FIG. 2). A method such as sputtering, vapor deposition, spray pyrolysis deposition (SPD) or CVD and the like can be used to form the transparent electrically conductive film 7. Among these, spray pyrolysis deposition is preferable from the viewpoint of equipment costs.

The material that composes the transparent substrate 6 is, for example, a transparent material, and examples of such transparent materials include glass such as borosilicate glass, soda lime glass, glass which is made of soda lime and whose iron component is less than that of ordinary soda lime glass or quartz glass, a resin film such as polyethylene terephthalate (PET), polyethylene naphthalate (PEN), polycarbonate (PC) and polyether sulfone (PES). The thickness of the transparent substrate 6 is suitably determined corresponding to the size of the dye-sensitized solar cell module 100, and although there are no particular limitations thereon, it is within the range of, for example, 50 μm to 10000 μm. Here, the thickest layer of the working electrode 1 is normally the transparent substrate 6. The transparent substrate 6 preferably does not contain a resin film having a thickness of 500 μm or less. In other words, the transparent substrate 6 is preferably composed of glass or a resin film having a thickness in excess of 500 μm. In this case, flexibility of the working electrode 1 is less than that of the counter electrode 2. Consequently, even if the working electrode 1 has the porous oxide semiconductor layers 8, there is no longer concern over the occurrence of cracking and the like in the porous oxide semiconductor layers 8 caused by bending. In addition, the working electrode 1 does not have a bending portion in this case.

Examples of material that composes the transparent electrically conductive film 7 include electrically conductive metal oxides such as indium tin oxide (ITO), tin oxide ($SnO_2$) or fluorine-doped tin oxide (FTO). The transparent electrically conductive film 7 may also be composed of a single layer or a laminate of a plurality of layers composed with different electrically conductive metal oxides. In the case the transparent electrically conductive film 7 is composed of a single layer, the transparent electrically conductive film 7 is preferably composed of FTO since it has high heat resistance and chemical resistance. In addition, a laminate composed of a plurality of layers is preferably used for the transparent electrically conductive film 7 since the laminate is able to reflect the characteristics of each layer. In particular, the use of a laminate of a layer composed of ITO and a layer composed of FTO is preferable. In this case, the transparent electrically conductive film 7 can be realized that has high electrical conductivity, high heat resistance and high chemical resistance. The thickness of the transparent electrically conductive film 7 is within the range of, for example, 0.01 μm to 2 μm.

Continuing, the wiring portion 11 is formed so as to surround areas where the plurality of porous oxide semiconductor layers 8 is scheduled to be formed (hereinafter referred to as "scheduled porous oxide semiconductor layer formation areas"). The wiring portion 11 can be obtained by forming the current collector wiring 12 so as to surround each of the plurality of scheduled porous oxide semiconductor formation areas, followed by arranging the wiring protective layer 13 so as to form the current collector wiring 12.

The current collector wiring 12 can be obtained by, for example, blending metal particles with a thickener such as polyethylene glycol to obtain a paste, and applying this paste so as to surround the porous oxide semiconductor layers 8 using screen printing and the like, followed by heating and baking. The wiring protective layer 13 can be obtained by, for example, blending an inorganic insulating material such as low melting point glass frit with a thickener, binder, dispersant or solvent and the like as necessary to obtain a paste, and applying the paste so as to cover the entire current collector wiring 12 by screen printing and the like, followed by heating and baking.

Next, pastes for forming the porous oxide semiconductor layers are printed on the plurality of scheduled porous oxide semiconductor layer formation areas on the surface of the transparent electrically conductive film 7 so that the pastes are mutually separate. In addition to oxide semiconductor particles, the paste for forming the porous oxide semiconductor layers contains a resin such as polyethylene glycol and a solvent such as terpineol. Examples of methods that can be used to print the paste for forming the porous oxide semiconductor layers include screen printing, doctor blade coating and bar coating.

Next, the paste for forming the porous oxide semiconductor layers is baked to form the porous oxide semiconductor layers 8 and obtain the working electrode 1.

Although varying according to the oxide semiconductor particles, the baking temperature is normally 350° C. to 600°

C., and although also varying according to the oxide semiconductor particles, the baking time is normally 1 hour to 5 hours.

Examples of the above-mentioned oxide semiconductor particles include titanium oxide ($TiO_2$), zinc oxide (ZnO), tungsten oxide ($WO_3$), niobium oxide ($Nb_2O_3$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$) and oxide semiconductor particles composed of two or more types thereof. A mean particle diameter of these oxide semiconductor particles is preferably 1 nm to 1000 nm since the surface area of the oxide semiconductor coated with dye increases, namely the size of sites where photoelectric conversion takes place increases, thereby enabling the formation of a larger number of electrons. Here, the porous oxide semiconductor layers 8 are preferably composed of laminates obtained by laminating oxide semiconductor particles having different particle size distributions. In this case, light is able to be repeatedly reflected within the laminates, and light can be efficiently converted to electrons without allowing incident light to escape outside the laminates. The thickness of the porous oxide semiconductor layers 8 is, for example, 0.5 μm to 50 μm. Furthermore, the porous oxide semiconductor layers 8 can also be composed with laminates consisting of a plurality of semiconductor layers composed of different materials.

(Counter Electrode)

Figure 3:
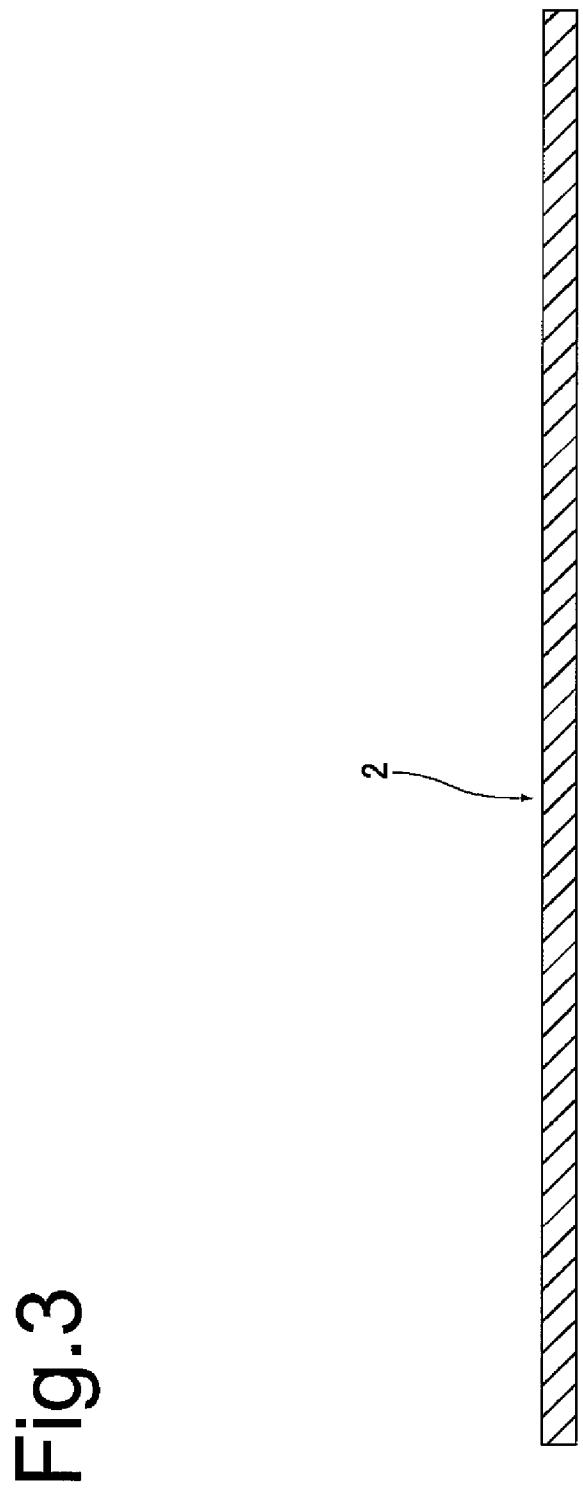
FIG. 3 is a cross-sectional view showing the other electrode of the pair of electrodes used in a manufacturing method for the dye-sensitized solar cell module of FIG. 1.

On the other hand, the counter electrode 2 can be obtained in the manner described below (FIG. 3).

Namely, the metal substrate 9 having a thickness of 100 μm or less is prepared (FIG. 4). The catalyst film 10 is then formed on the metal substrate 9. Sputtering or vapor deposition and the like are used as a method for forming the catalyst film 10. Among these, sputtering is preferable from the viewpoint of film uniformity.

At this time, the metal substrate 9 is composed of titanium, nickel, stainless steel, platinum or a metal composed of two or more types of alloys thereof. Although these metals can be used regardless of the type of the electrolyte 3, they are particularly preferable in the case the electrolyte 3 contains iodine since they have corrosion resistance with respect to iodine. Among these, the metal substrate 9 is preferably composed of titanium from the viewpoints of corrosion resistance, price and availability. Although the thickness T1 of the metal substrate 9 is required to be 100 μm or less, it is preferably 5 μm to 40 μm, more preferably 5 μm to 35 μm, even more preferably 10 μm to 30 μm, and particularly preferably 10 μm to 20 μm. In this case, the rate of decrease in photoelectric conversion efficiency can be effectively reduced. Thus, a more highly reliable dye-sensitized solar cell module 100 can be obtained.

The catalyst film 10 is composed of platinum, carbon-based material or electrically conductive polymer and the like.

[Partition Forming Portion Formation Step]

Figure 5:
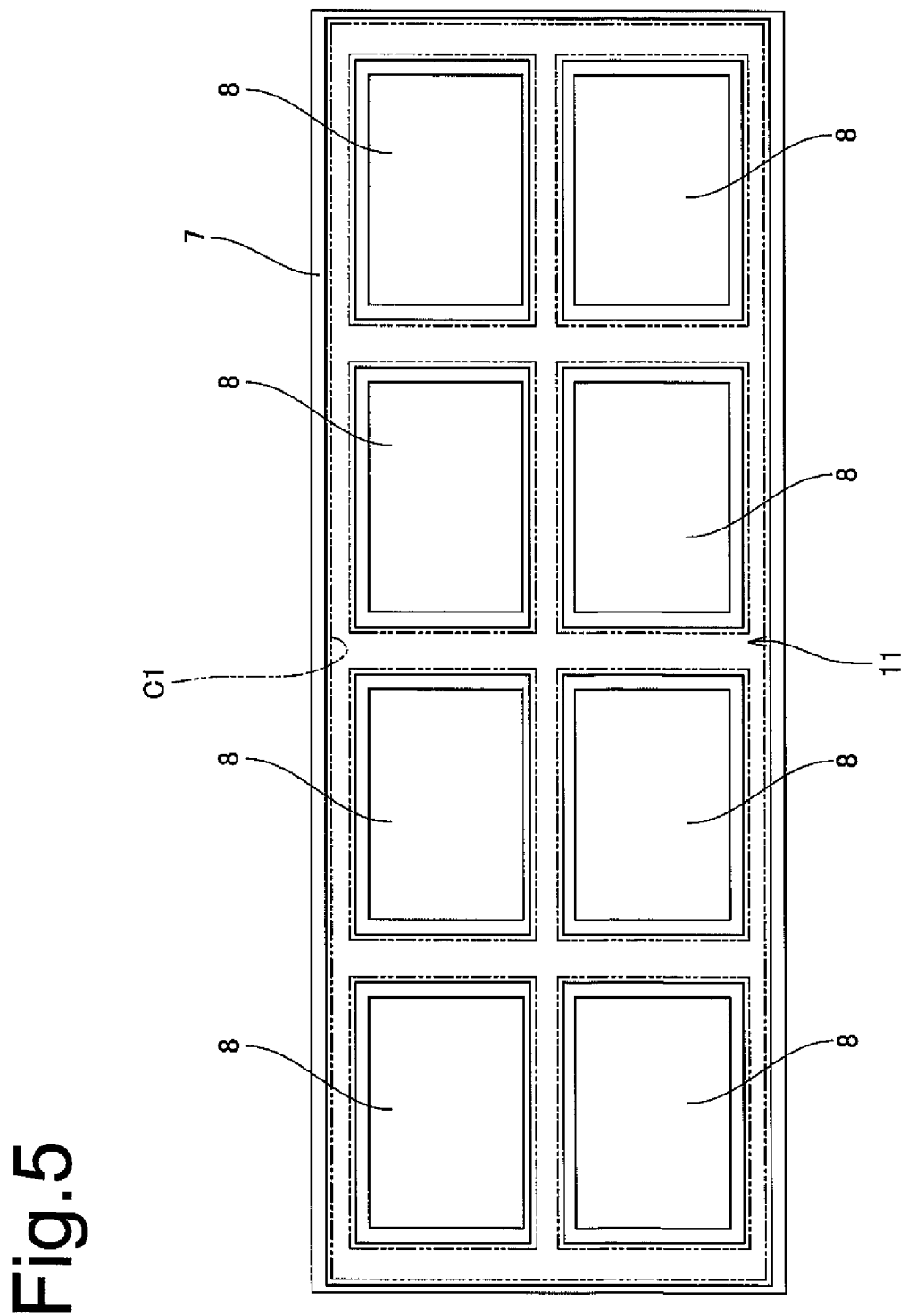
FIG. 5 is an overhead view showing the electrode of FIG. 2.
Figure 6:
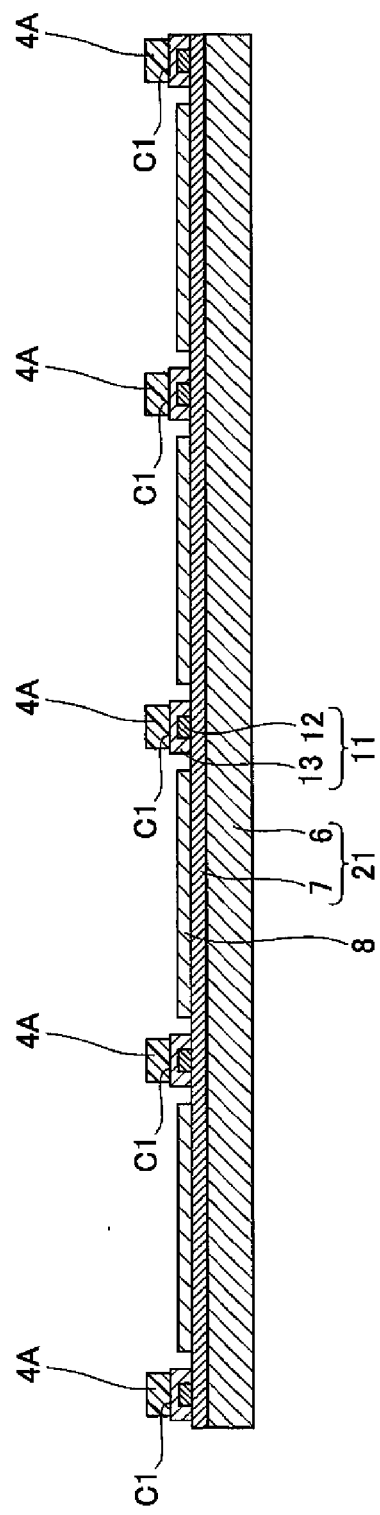
FIG. 6 is a cross-sectional view showing a step in a manufacturing method for the dye-sensitized solar cell module of FIG. 1.

Next, as shown in FIGS. 5 and 6, first partition forming portions 4A are formed at lattice-like first sites C1 that are sites on the wiring portion 11 of the working electrode 1. The first partition forming portions 4A can be obtained by, for example, melting a thermoplastic resin by heating and adhering to the first sites C1.

Figure 7:
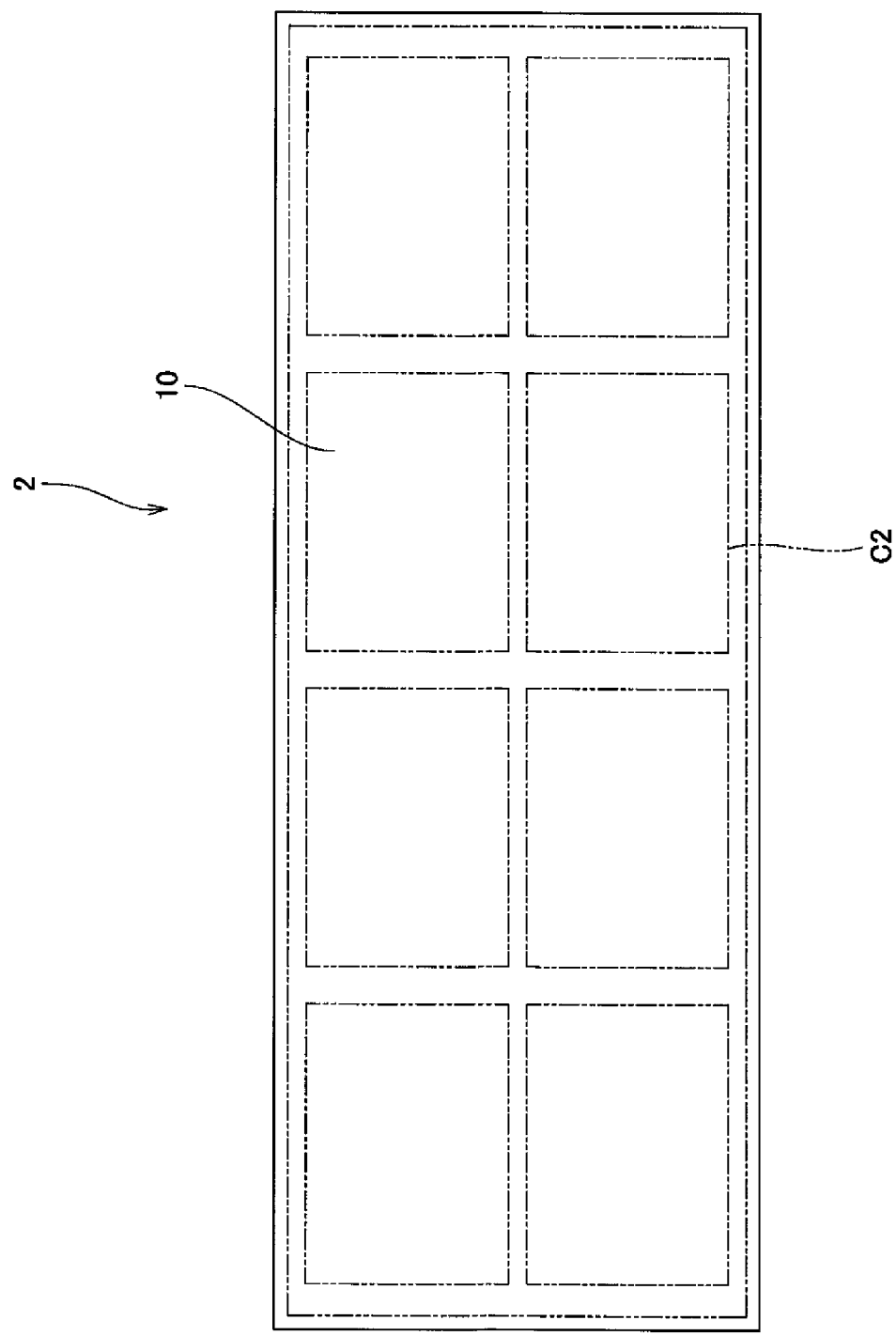
FIG. 7 is an overhead view showing the electrode of FIG. 3.
Figure 8:
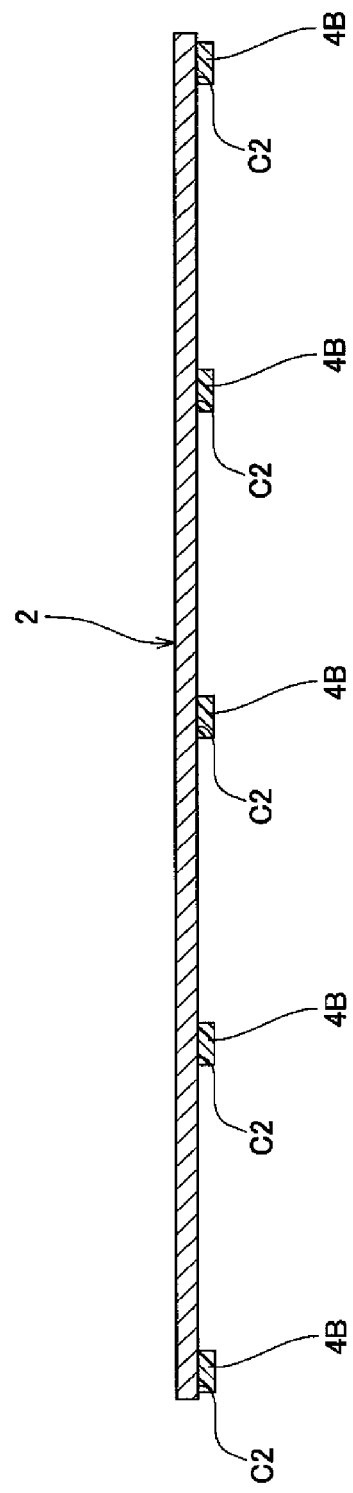
FIG. 8 is a cross-sectional view showing a step in a manufacturing method for the dye-sensitized solar cell module of FIG. 1.

On the other hand, as shown in FIGS. 7 and 8, second partition forming portions 4B are formed at lattice-like second sites C2 that are sites on the surface of the catalyst film 10 of the counter electrode 2. The second sites C2 have a shape that matches that of the first sites C1 on the transparent electrically conductive electrode 21. The second partition forming portions 4B can be obtained by, for example, melting a thermoplastic resin by heating and adhering to the catalyst film 10.

Examples of thermoplastic resins that are preferably used to form the first partition forming portions 4A and the second partition forming portions 4B include acid-modified polyethylene, polyvinyl alcohol and ethylene-vinyl alcohol copolymers. In this case, leakage of the electrolyte 3 caused by penetrating into the first partition forming portions 4A or the second partition forming portions 4B can be more adequately inhibited. Furthermore, an acid-modified polyethylene refers to that in which an acid has been randomly copolymerized, alternately copolymerized, block copolymerized or graft copolymerized to polyethylene, or that in which these have been neutralized with metal ions. As an example thereof, ethylene-methacrylic acid copolymer is an acid-modified polyethylene since it is obtained by copolymerizing ethylene and methacrylic acid. In addition, an ionomer obtained by neutralizing ethylene-methacrylic acid copolymer with metal ions is also an acid-modified polyethylene.

Here, from the viewpoint of improving adhesion between the first partition forming portions 4A and the second partition forming portions 4B, the material that composes the first partition forming portions 4A and the second partition forming portions 4B is preferably a combination of resins selected from the above-mentioned acid-modified polyethylenes. For example, a combination in which the resin that composes the first partition forming portions 4A is composed of an ionomer while the resin that composes the second partition forming portions 4B is composed of a maleic anhydride-modified polyethylene, or a combination in which the resin that composes the first partition forming portions 4A is composed of a maleic anhydride-modified polyethylene while the resin that composes the second partition forming portions 4B is composed of an ionomer, is preferable.

In this case, since acid-modified polyethylene has a comparatively low melting point in comparison with polyvinyl alcohol or ethylene-vinyl alcohol copolymers, the resins of the first partition forming portions 4A and the second partition forming portions 4B easily melt and adhere at a comparatively low temperature. In addition, even if the resins of the first partition forming portions 4A and the second partition forming portions 43 are different types of acid-modified polyethylenes, they have favorable compatibility since their mutual monomer is ethylene, thereby resulting in superior adhesion and sealability between the first partition forming portions 4A and the second partition forming portions 4B in an encapsulating portion formation step to be subsequently described.

More preferably, the materials that compose the first partition forming portions 4A and the second partition forming portions 4B are the same resins selected from the above-mentioned acid-modified polyethylenes. For example, a combination in which the resin that composes the first partition forming portions 4A and the resin that composes the second partition forming portions 4B are the same ionomers, or a combination in which the resin that composes the first partition forming portions 4A and the resin that composes the second partition forming portions 43 are the same maleic anhydride-modified polyethylenes, is preferable.

Here, the same resins naturally include resins in which the molar ratio of acid monomer that modifies the polyethylene to ethylene repeating units is the same, as well as resins in which this molar ratio is different. For example, an ethylene-methacrylic acid copolymer in which the molar ratio of acid monomer to ethylene repeating units is 5% and an ethylene-methacrylic acid copolymer in which the molar ratio of acid monomer to ethylene repeating units is 10% are the same resins. In this case, since the melting points, melt flow rates and various other thermal properties of the resins used are similar, they both easily melt and adhere at the same timing. Consequently, in comparison with the case of using resins having melting points and melt flow rates that differ considerably, the heating and melting time can be easily controlled and the encapsulating portion formation step to be subsequently described can be carried out easily.

[Dye Loading Step]

Next, a photosensitizing dye is loaded onto the plurality of porous oxide semiconductor layers 8 of the working electrode 1. In order to accomplish this, the working electrode 1 is immersed in a solution containing the photosensitizing dye, and after allowing the photosensitizing dye to adsorb onto the porous oxide semiconductor layers 8, excess dye is rinsed off with a solvent component of the solution followed by drying to adsorb the photosensitizing dye onto the porous oxide semiconductor layers 8. However, the photosensitizing dye can also be loaded onto the plurality of porous oxide semiconductor layers 8 by adsorbing the photosensitizing dye onto an oxide semiconductor porous film by applying a solution containing the photosensitizing dye onto the porous oxide semiconductor layers 8 followed by drying.

Examples of the photosensitizing dye include ruthenium complexes having a ligand containing a bipyridine structure or terpyridine structure, and organic dyes such as porphyrin, eosin, rhodamine or merocyanine.

[Lamination Step]

Next, the working electrode 1 and the counter electrode 2 are laminated under reduced pressure to form the partitions 15 having a plurality of openings between the working electrode 1 and the counter electrode 2. At this time, the partitions 15 are formed so that the porous oxide semiconductor layers 8 are arranged on the inside of each opening.

Figure 9:
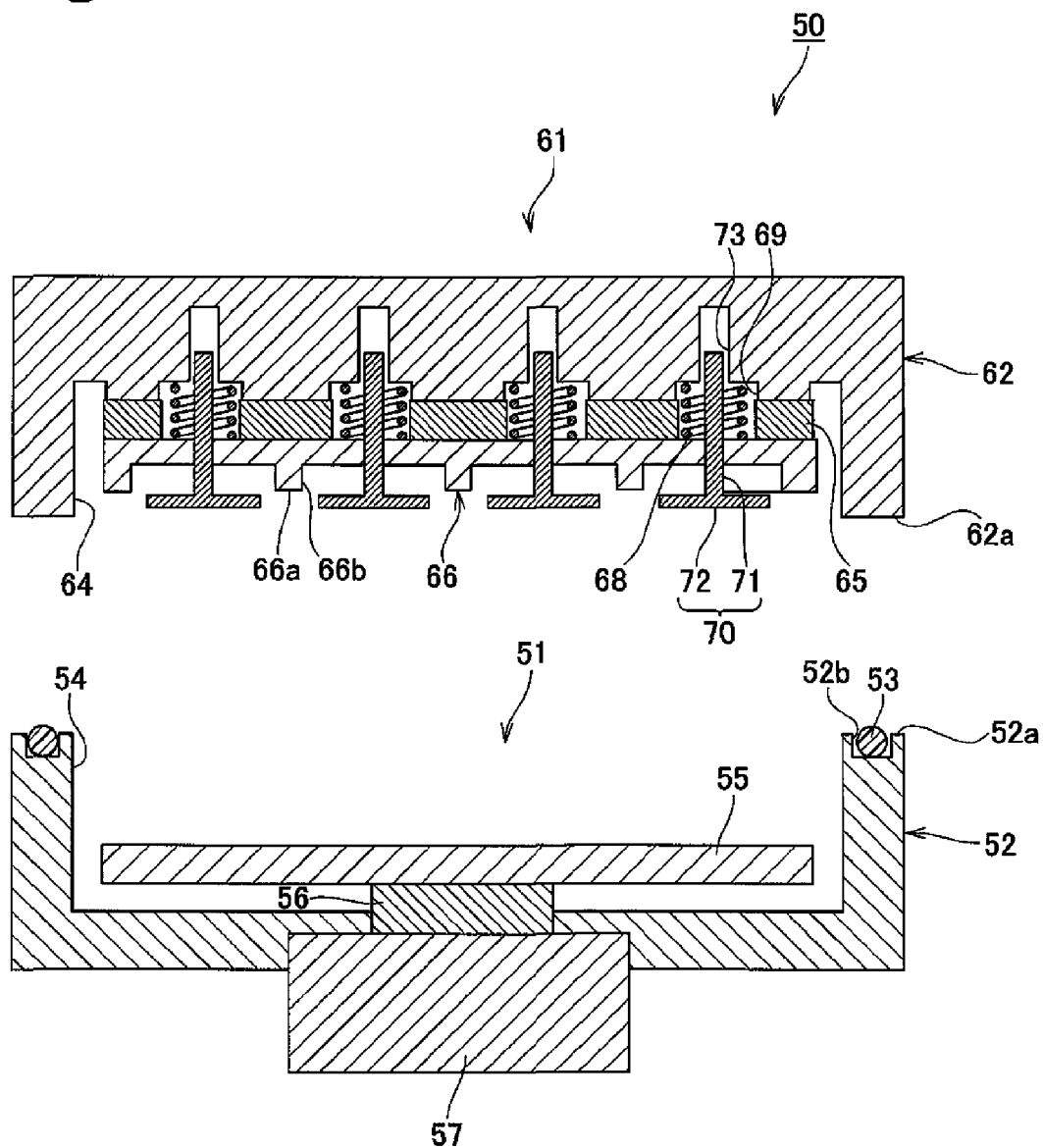
FIG. 9 is a cross-sectional view showing an example of a lamination device used when laminating the pair of electrodes in a manufacturing method for the dye-sensitized solar cell module of FIG. 1.

Here, a lamination device used to laminate the working electrode 1 and the counter electrode 2 is explained using FIG. 9. FIG. 9 is a cross-sectional view showing an example of a lamination device. A lamination device 50 shown in FIG. 9 is provided with a first holding portion 51 that holds the working electrode 1, and a second holding portion 61 that holds the counter electrode 2.

The first holding portion 51 has a base portion 52, and the base portion 52 has an annular abutting surface 52a that is abutted with the second holding portion 61. A housing groove 52b that houses a sealing material 53 is formed in the abutting surface 52a along the abutting surface 52a. A housing depressed portion 54 that houses the working electrode 1 inside the annular abutting surface 52a is formed in the base portion 52. A holding member 55 for holding the working electrode 1 is arranged inside the housing depressed portion 54. In addition, a cylinder 56 penetrably provided in the bottom of the housing depressed portion 54 and fixed to the holding member 55, and a driving portion 57 fixed to the base portion 52 that via the cylinder 56 reciprocally moves the holding member 55 up and down, are provided in the housing depressed portion 54. The driving portion 57 is composed of, for example, an oil pressure pump. Thus, when the working electrode 1 is arranged on the holding member 55 and the driving portion 57 is driven, it is possible for the cylinder 56 to move up and down and to change the position of the working electrode 1.

On the other hand, the second holding portion 61 has a base portion 62, and the base portion 62 has an annular abutting surface 62a that is abutted with the base portion 52 of the first holding portion 51. A housing depressed portion 64 that houses the counter electrode 2 inside the annular abutting surface 62a is formed in the base portion 62. A heater 66 is fixed to the bottom of the housing depressed portion 64 through an insulating member 65. The heater 66 has lattice-like heating surfaces 66a that protrude towards the opposite side of the bottom of the base portion 62 in order to be able to locally heat the first partition forming portions 4A and the second partition forming portions 4B, and depressed portions 66b formed so as to be surrounded by the heating surfaces 66a of the heater 66. The second holding portion 61 has spring housing portions 69 formed by the insulating member 65, the heater 66 and the base portion 62 that house coil springs 68 on the opposite side of the heater 66 from the depressed portions 66b. The second holding portion 61 has bending portion forming members 70 for forming the bending portion 2a in the counter electrode 2. The bending portion forming members 70 are composed of a rod-like penetrating portion 71 that penetrates the depressed portion 66b of the heater 66 and the coil spring 68, and a plate-like pushing portion 72 provided on one end of the penetrating portion 71 that pushes on the counter electrode 2. Regulating holes 73 that regulate movement of the bending portion forming member 70 are formed in the bottom of the housing depressed portion 64.

The first holding portion 51 and the second holding portion 61 are able to form a sealed space composed by the housing depressed portion 54 and the housing depressed portion 64 by abutting the abutting surface 52a of the first holding portion 51 and the abutting surface 62a of the second holding portion 61. The lamination device 50 is further provided with a vacuum pump (not shown) for reducing pressure in the above-mentioned sealed space.

Next, an explanation is provided of a method for laminating the working electrode 1 and the counter electrode 2 using the lamination device 50 while referring to FIGS. 10 to 14. FIGS. 10 to 14 are cross-sectional views showing a series of steps of a manufacturing method for the dye-sensitized solar cell module of FIG. 1.

Figure 10:
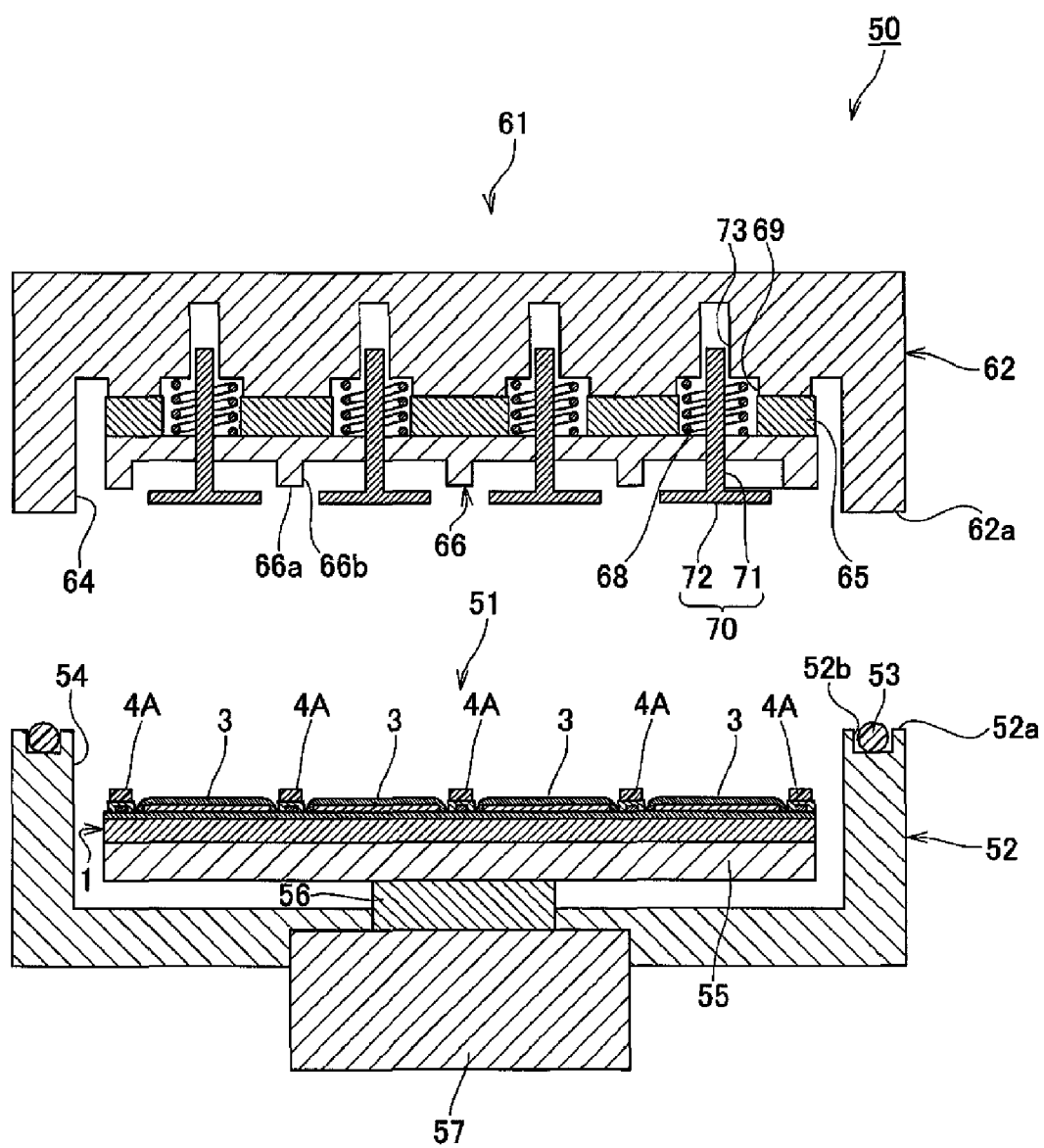
FIG. 10 is a cross-sectional view showing a step in a manufacturing method for the dye-sensitized solar cell module of FIG. 1.

First, as shown in FIG. 10, the working electrode 1, in which the first partition forming portions 4A are formed on the wiring portion 11, is arranged on the holding member 55.

Continuing, the electrolyte 3 is arranged on the working electrode 1 inside the first partition forming portions 4A. The electrolyte 3 can be obtained by injecting or printing so as to cover the porous oxide semiconductor layers 8 on the working electrode 1 inside the first partition forming portions 4A.

Here, in the case the electrolyte 3 is a liquid, the electrolyte 3 is preferably injected beyond the first partition forming portions 4A until it overflows to the outside of the first partition forming portions 4A. In this case, the electrolyte 3 can be adequately injected inside the first partition forming portions 4A. In addition, when forming the partitions 15 by adhering the first partition forming portions 4A and the second partition forming portions 4B, air can be adequately evacuated from the cell spaces 14 surrounded by the working electrode 1, the counter electrode 2 and the partitions 15, thereby making it possible to adequately improve photoelectric conversion efficiency. Furthermore, even if the adhesion sites of the first partition forming portions 4A are moistened by the electrolyte 3 as a result of injecting the electrolyte 3 beyond the first partition forming portions 4A until it overflows outside the first partition forming portions 4A, since the first partition forming portions 4A and the second partition forming portions 4B are both composed of thermoplastic resins, decreases in adhesive strength attributable to a decrease in wettability can be adequately reduced and the first partition forming portions 4A and the second partition forming portions 4B are securely adhered during adhesion of the first partition forming portions 4A and the second partition forming portions 4B.

The electrolyte 3 is normally composed of an electrolytic solution, and this electrolytic solution contains, for example, a redox couple such as $I^-/I_3^-$ and an organic solvent. Examples of organic solvents include acetonitrile, methoxyacetonitrile, methoxypropionitrile, propionitrile, ethylene carbonate, propylene carbonate, diethyl carbonate, γ-butyrolactone and the like. In addition to $I^-/I_3^-$, examples of redox couples include a bromine/bromide ion couple. The dye-sensitized solar cell 100 is particularly effective in the case of using for the electrolyte 3 an electrolytic solution containing a volatile solute such as $I^-/I_3^-$ for the redox couple and an organic solvent that readily volatilizes at high temperatures, such as acetonitrile, methoxyacetonitrile or methoxypropionitrile. This is because, in this case, the change in internal pressure of the cell spaces 14 caused by a change in ambient environmental temperature of the dye-sensitized solar cell 100 becomes particularly large, and the electrolyte 3 easily leaks from the interfaces between the partitions 15 and the counter electrode 2 and from the interfaces between the partitions 15 and the working electrode 1. Furthermore, a gelling agent may also be added to the above-mentioned volatile solvent. In addition, the electrolyte 3 may also be composed of an ionic liquid electrolyte consisting of a mixture of an ionic liquid and a volatile component. In this case as well, this is due to the large change in internal pressure of the cell spaces 14 caused by a change in ambient environmental temperature of the dye-sensitized solar cell 100. A known iodine salt such as pyridinium salt, imidazolium salt or triazolium salt that is an ambient temperature molten salt which is in a molten state in the vicinity of room temperature is used for the ionic liquid. An example of such an ambient temperature molten salt preferably includes 1-ethyl-3-methylimidazolium bis(trifluoromethylsulfonyl)imide. In addition, examples of volatile components include the above-mentioned organic solvents as well as 1-methyl-3-methylimidazolium iodide, LiI, $I_2$ and 4-t-butylpyridine. Quasi-solid electrolytes, which are obtained in the form of a gel by mixing $SiO_2$, $TiO_2$ or nanoparticles such as carbon nanotubes with the above-mentioned ionic liquid electrolytes, in the form of nanocomposite ion-gel electrolytes may also be used for the electrolyte 3, and ionic liquid electrolytes may be used that are obtained by gelling using an organic gelling agent such as polyvinylidene fluoride, polyethylene oxide derivatives or amino acid derivatives.

Figure 11:
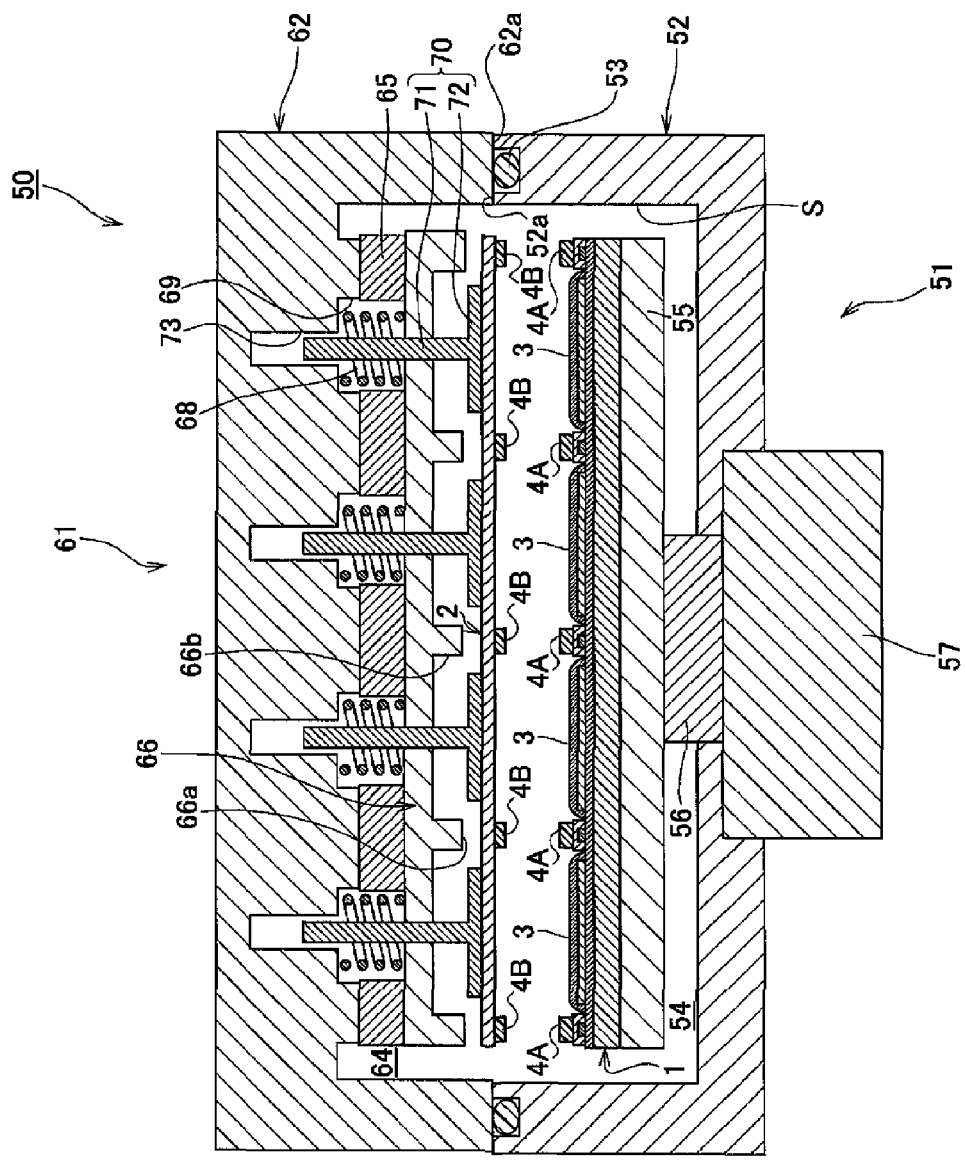
FIG. 11 is a cross-sectional view showing a step in a manufacturing method for the dye-sensitized solar cell module of FIG. 1.

Next, as shown in FIG. 11, after the counter electrode 2 has been fixed to the bending portion forming members 70 contained in the second holding portion 61, the abutting surface 52a of the first holding portion 51 and the abutting surface 62a of the second housing depressed portion 61 are abutted. At this time, since the sealing material 53 is housed in the housing groove 52b of the abutting surface 52a, a sealed space S is formed by abutting the abutting surface 52a and the abutting surface 62a.

Next, this sealed space S is depressurized with a vacuum pump.

At this time, the pressure in the sealed space S is normally within the range of 50 Pa to less than 1013 hPa, is preferably 50 Pa to 800 Pa, and is more preferably 300 Pa to 800 Pa.

In the case of the organic solvent contained in the electrolyte 3 being a volatile solvent in particular, the pressure in the sealed space S is preferably 700 Pa to 1000 Pa and more preferably 700 Pa to 800 Pa. If the pressure is within the above-mentioned ranges, in comparison with the case of the pressure being outside the above-mentioned ranges, in addition to further inhibiting volatilization of the organic solvent when forming the electrolyte 3 inside the first partition forming portions 4A, the working electrode 1, the counter electrode 2 and the partitions 15 are more securely adhered in the resulting dye-sensitized solar module 100, thereby reducing susceptibility to the occurrence of leakage of the electrolyte layer 3.

In addition, in the case the electrolyte 3 contains an ionic liquid, it is not necessary to increase the pressure in the sealed space S in consideration of volatilization of the electrolyte 3 as in the case of the electrolyte 3 containing a volatile solvent since ionic liquid does not volatilize. Consequently, the pressure inside the sealed space S may be 50 Pa to 700 Pa.

Moreover, in the case the electrolyte 3 contains a gel electrolyte, since the case in which the main component of the precursor to be gelled is a volatile substance and the case in which it is an ionic liquid differ, the pressure inside the sealed space is preferably 600 Pa to 800 Pa in the case the main component of the precursor is a volatile substance, and preferably 50 Pa to 700 Pa in the case it is an ionic liquid. Thus, in the case the electrolyte 3 contains a gel electrolyte, the pressure inside the sealed space S is preferably 50 Pa to 800 Pa.

Figure 12:
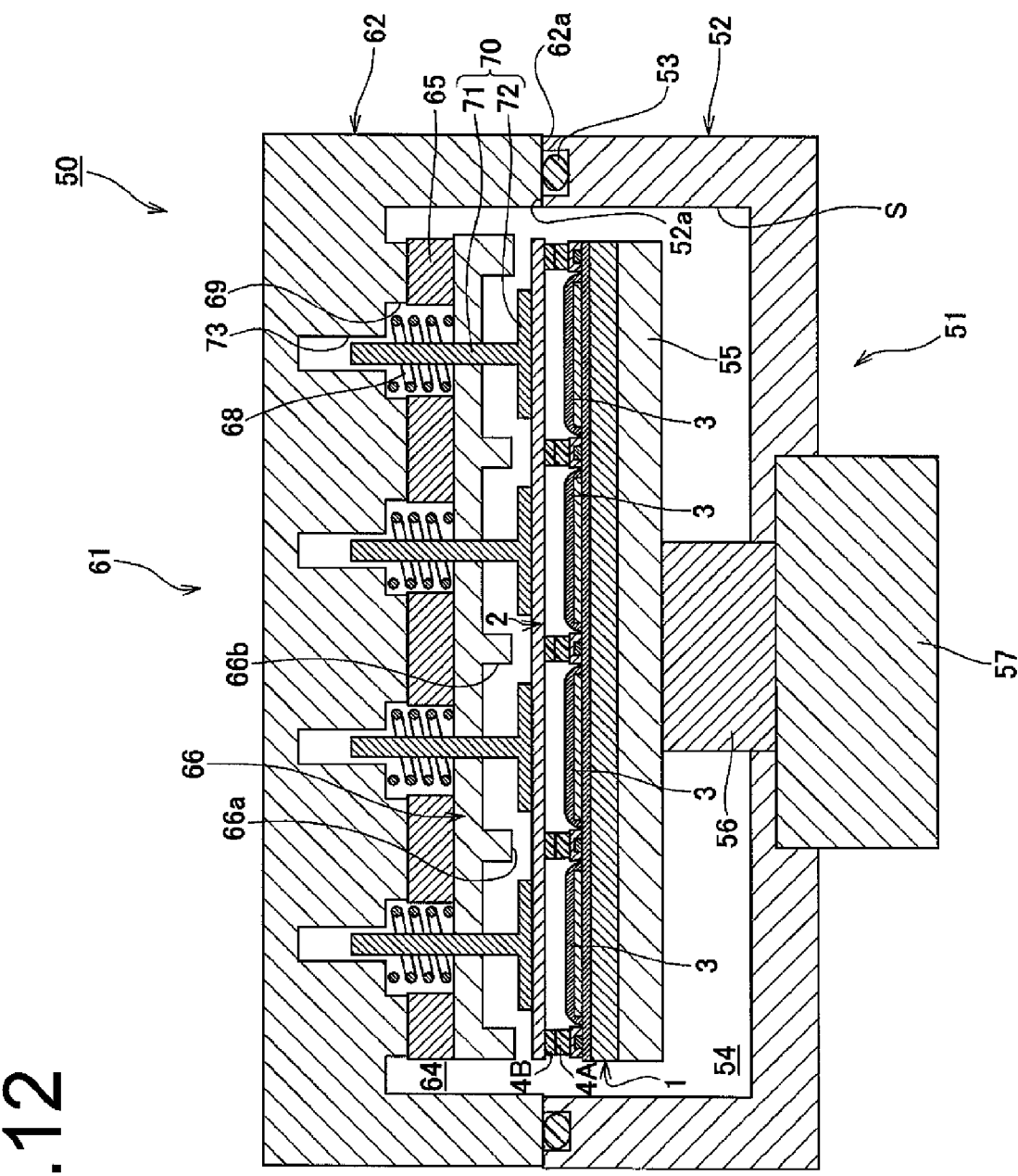
FIG. 12 is a cross-sectional view showing a step in a manufacturing method for the dye-sensitized solar cell module of FIG. 1.

As shown in FIG. 12, the driving portion 57 is driven while depressurizing the sealed space S, and the holding member 55 is moved until the first partition forming portions 4A and the second partition forming portions 4B make contact by further moving the cylinder 56. At this time, the heating surfaces 66a of the heater 66 are still not in contact with the counter electrode 2.

Figure 13:
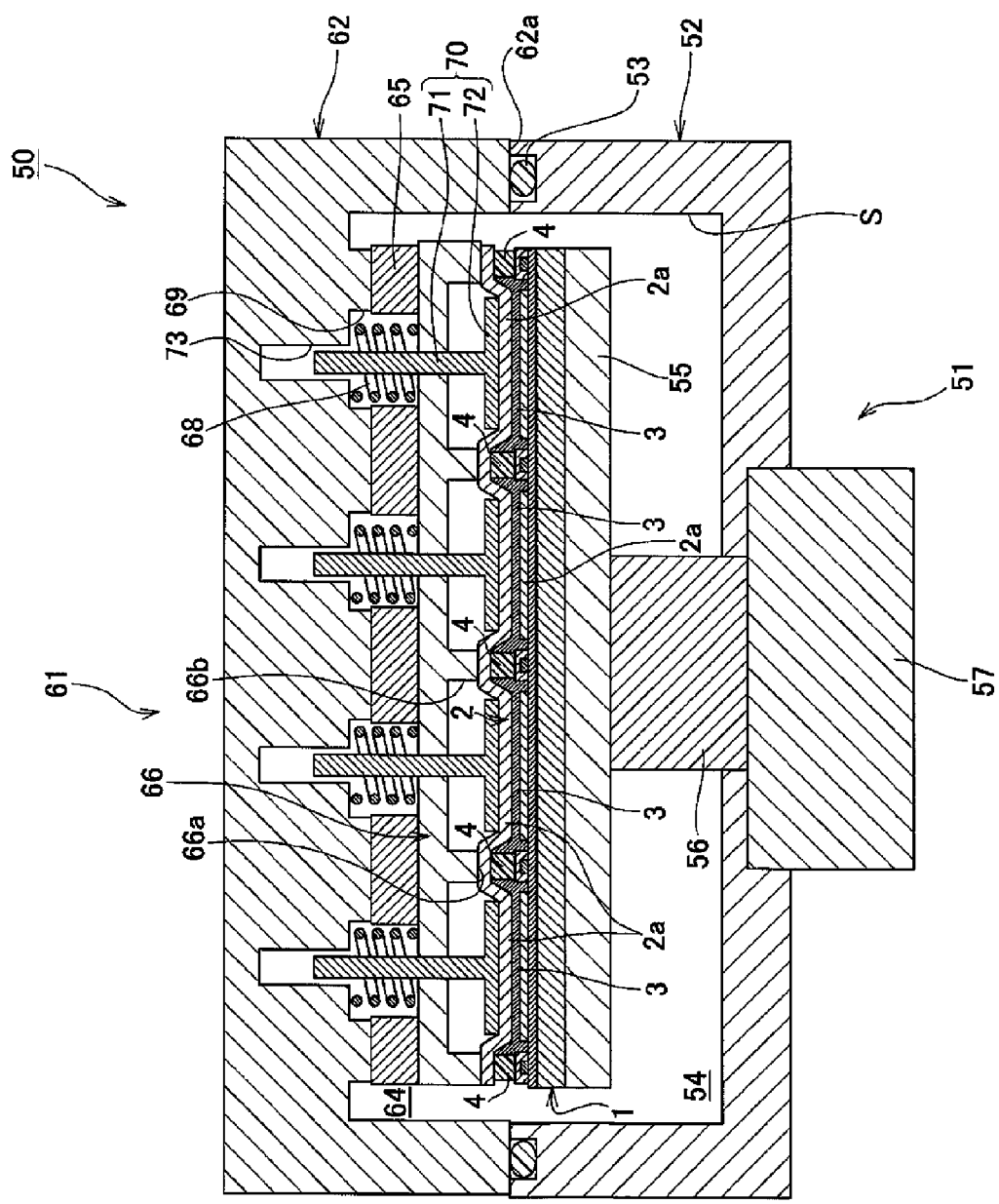
FIG. 13 is a cross-sectional view showing a step in a manufacturing method for the dye-sensitized solar cell module of FIG. 1.

Next, the driving portion 57 is driven and the cylinder 56 is further moved to cause the holding member 55 to move towards the counter electrode 2. At this time, the holding member 55 is moved until the counter electrode 2 contacts the heating surfaces 66a of the heater 66. Also at this time, since the heater 66 is pushed back towards the working electrode 1 by the elastic force of the coil springs 68, the first partition forming portions 4A on the side of the working electrode 1 and the second partition forming portions 4B on the side of the counter electrode 2 can be adhered tightly. The bending portion forming members 70 are moved towards the depressed portions 66b of the heater 66 accompanying movement of the counter electrode 2. At this time, when the distal end of the penetrating portion 71 of the bending portion forming members 70 reaches the bottom of the regulating holes 73, movement of the bending portion forming members 70 is regulated. At this time, movement of the bending portion forming members 70 is regulated at the location where the pushing portion 72 protrudes towards the working electrode 1 beyond the heating surfaces 66a of the heater 66. Consequently, if the counter electrode 2 is continued to be moved towards the heater 66 after it has contacted the heating surfaces 66a of the heater 66, the bending portion 2a is formed in the counter electrode 2 so as to protrude towards the cell spaces 14 as shown in FIG. 13.

In this state, the overlapping portions of the first partition forming portions 4A and the second partition forming portions 4B are heated by the heating surfaces 66a of the heater 66 under application of pressure to hot-melt the first partition forming portions 4A and the second partition forming portions 4B. The partitions 15 are formed in this manner.

At this time, the pressure applied to the first partition forming portions 4A and the second partition forming portions 4B is normally 1 MPa to 50 MPa, preferably 2 MPa to 30 MPa and more preferably 3 MPa to 20 MPa.

In addition, the temperature of the heater 66 when melting the first partition forming portions 4A and the second partition forming portions 4B is equal to or higher than the melting point of the thermoplastic resin for forming the first partition forming portions 4A and the second partition forming portions 4B. Since the thermoplastic resin for forming the first partition forming portions 4A and the second partition forming portions 4B does not melt if the above-mentioned temperature is lower than the melting point of the thermoplastic resins, the first partition forming portions 4A and the second partition forming portions 4B are unable to adhere and form the partitions 15.

However, the temperature of the heater 66 when melting the first partition forming portions 4A and the second partition forming portions 4B is preferably (thermoplastic resin melting point+200° C.) or lower. If the above-mentioned temperature exceeds (thermoplastic resin melting point+200° C.), there is the risk of the thermoplastic resin contained in the first partition forming portions 4A and the second partition forming portions 4B being decomposed by heat.

Figure 14:
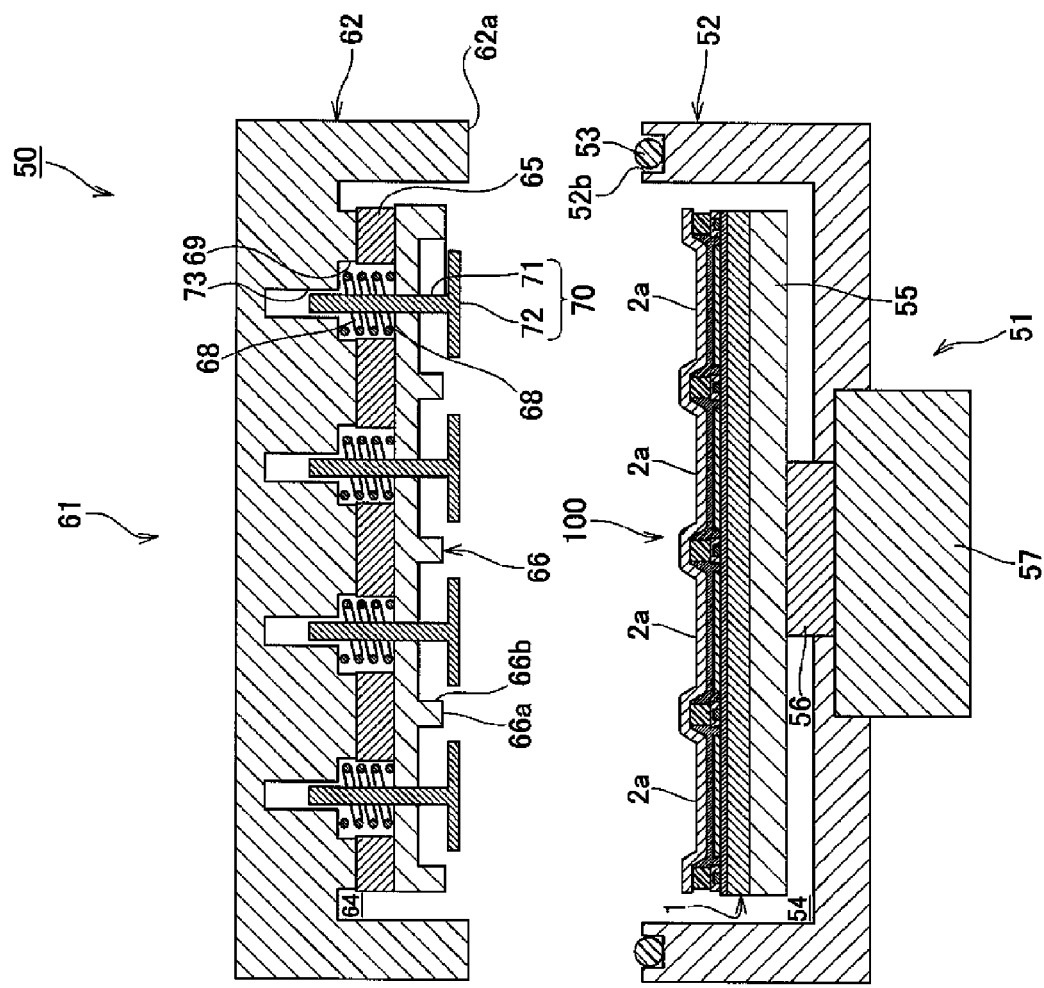
FIG. 14 is a cross-sectional view showing a step in a manufacturing method for the dye-sensitized solar cell module of FIG. 1.

Next, operation of the vacuum pump is stopped. Continuing, as shown in FIG. 14, the holding member 55 is lowered by the driving portion 57 through the cylinder 56, and the second holding portion 61 is separated from the first holding portion 51.

The dye-sensitized solar cell module 100 is obtained in this manner and manufacturing of the dye-sensitized solar cell module 100 is completed.

Figure 15:
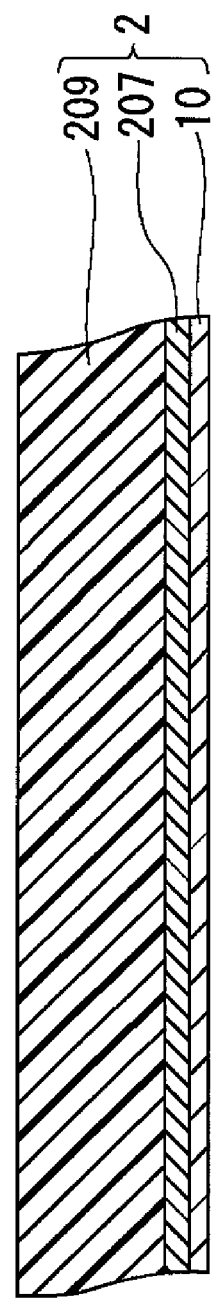
FIG. 15 is a partial cross-sectional view showing another example of the other electrode of the pair of electrodes used in a manufacturing method for the dye-sensitized solar cell module of FIG. 1.

The present invention is not limited to the above-mentioned embodiment. For example, although the counter electrode 2 is composed of the metal substrate 9 and the catalyst film 10 in the above-mentioned embodiment, as shown in FIG. 15, a resin film 209 may be used instead of the metal substrate 9 in the counter electrode 2. For example, the counter electrode 2 may be composed of the resin film 209, an electrically conductive film 207 formed on the resin film 209, and the catalyst film 10 formed on the electrically conductive film 207. However, in this case, a thickness T2 of the resin film 209 is required to be 500 μm or less. This is because, if the thickness T2 of the resin film 209 exceeds 500 μm, there is prominent occurrence of spring back phenomenon in the counter electrode 2 containing the resin film 209. Furthermore, the thickness T2 of the resin film 209 is preferably 50 μm to 400 μm and more preferably 100 μm to 300 μm. In the case the thickness T2 of the resin film 209 is 50 μm or more, the resin film is resistant to shocks (stress) from the outside and leakage of the electrolyte 3 can be more adequately inhibited in comparison with the case of the thickness of the resin film being less than 50 μm. Examples of resins for the resin film 209 include polyethylene naphthalate (PEN) or polyethylene terephthalate (PET). The electrically conductive film 207 is required to be composed of a material that has electrical conductivity, and examples of materials of the electrically conductive film 207 include titanium and the same materials used in the transparent electrically conductive film 7.

In addition, although the counter electrode 2 is composed of two layers consisting of the metal substrate 9 and the catalyst film 10 in the above-mentioned embodiment, it may also be composed of more than two layers. In this case, the thickest layer is a metal substrate having a thickness of 100 μm or less or a resin film having a thickness of 500 μm or less.

In addition, the transparent substrate 6 of the working electrode 1 may also be the resin film 209 having a thickness of 500 μm or less. However, in this case, the working electrode 1 also has a bending portion that bends so as to protrude towards the opposing counter electrode 2.

In addition, although the working electrode 1 is composed of the transparent substrate 6, the transparent electrically conductive film 7, the porous oxide semiconductor layers 8 and the wiring portion 11, while the counter electrode 2 is composed of the metal substrate 9 and the catalyst film 10 in the above-mentioned embodiment, the counter electrode may be composed of the transparent substrate 6 and the transparent electrically conductive film 7, and the working electrode may be composed of metal substrate 9, the catalyst film 10 and the porous oxide semiconductor layers 8 provided on the catalyst film 10. In addition, although the partitions 15 and the wiring portion 11 are arranged so as to overlap in the above-mentioned embodiment, they may also be provided without overlapping. For example, the wiring portion 11 may also be arranged between the partitions 15 and the porous oxide semiconductor layers 8.

Moreover, although all of the plurality of cells 16 are connected in parallel in the above-mentioned embodiment, the bending portion 2a of the counter electrode 2 that composes each cell 16 and the working electrode 1 of the cell 16 adjacent to that cell 16 may be electrically connected by electrically conductive members (not shown) that pass through the partitions 15, and the plurality of cells 16 may be connected in series as a result thereof.

Moreover, although the porous oxide semiconductor layers 8 are formed on the surface of the transparent electrically conductive electrode 21 in the above-mentioned embodiment, they can also be formed on the surface of the counter electrode 2.

In addition, although the first partition forming portions 4A are fixed to the working electrode 1 and the second partition forming portions 4B are fixed to the counter electrode 2 in order to form partition forming portions 4 between the working electrode 1 and the counter electrode 2 when manufacturing the dye-sensitized solar cell module 100 in the above-mentioned embodiment, they may also only be fixed on either one of the electrodes.

EXAMPLES

Although the following provides a more detailed explanation of the contents of the present invention by listing examples thereof, the present invention is not limited to the following examples.

Example 1

To begin with, a fluorine-doped tin oxide, transparent electrically conductive glass substrate (FTO substrate) measuring 20 cm×20 cm×4 mm (thickness) was prepared. Continuing, a 500° C. sintering silver paste was applied onto the FTO substrate so as to form a lattice-like pattern and extracting pattern extracted from a portion of the outer periphery of the lattice-like pattern. At this time, the lattice-like pattern was formed by applying a titanium oxide paste so that lattices consisting of 3 rows×5 columns (length: 6 cm, width: 1.2 cm) were formed in an area measuring 18 cm×18 cm. However, the width of the outer periphery of the lattice-like pattern was made to be 2 mm, while the width of other portions was made to be 1.5 mm. The silver paste composed of a lattice-like pattern and extracting pattern was baked at 500° C. to obtain current collector wiring composed of silver and having a thickness of about 10 μm.

Next, titanium oxide paste is applied and baked in each of the lattices of the lattice-like pattern so as to have a rectangular shape at locations about 1 mm from the current collector wiring to form porous oxide semiconductor layers having a thickness of about 20 μm.

Next, the portions of the lattice-like pattern of the current collector wiring were covered with low melting point glass frit and backed at 520° C. to form a wiring protective layer having a thickness of 50 μm. A working electrode was obtained in this manner.

Next, a polyolefin-based hot melt resin having a thickness of 20 μm was laminated so as to cover the wiring protective layer followed by melting and adhering to form first partition forming portions. At this time, the hot melt resin was made not to overlap the porous oxide semiconductor layers.

Continuing, the working electrode was immersed for a day and a night in an absolute ethanol solution which dissolved a photosensitizing dye in the form of N719 dye to a concentration of 0.2 mM to load the photosensitizing dye on the working electrode.

On the other hand, a metal substrate was prepared composed of pure metal titanium foil measuring 20 cm×20 cm×40 μm (thickness), and after carrying out plasma cleaning on the surface of this metal substrate, a platinum catalyst film having a thickness of about 30 nm was formed over the entire surface thereof by sputtering to obtain a counter electrode.

Next, a polyolefin-based hot melt resin was prepared to serve as a lattice-like pattern in which lattices consisting of 3 rows×5 columns (length: 6 cm, width: 1.2 cm) in an area measuring 18 cm×18 cm was formed. However, the width of the outer periphery of the lattice-like pattern was made to be 2 mm while the width of the other portions was made to be 1.5 mm. Next, the polyolefin-based hot melt resin was arranged on the platinum catalyst film of the counter electrode followed by melting and adhering. Second partition forming portions were formed on the counter electrode in this manner.

Next, the working electrode provided with the first partition forming portions and the counter electrode provided with the second partition forming portions were formed using the lamination device 50 shown in FIG. 9. More specifically, the working electrode provided with the first partition forming portions was first arranged on the holding member 55 so that the surfaces on the side of the porous oxide semiconductor layers of the FTO substrate were horizontal. On the other hand, the counter electrode provided with the second partition forming portions was fixed to the pushing portion 72 of the bending portion forming members 70 using a microadhesive.

An extremely small amount (about 0.01 ml) of an electrolytic solution was then dropped in dry air at −35° C. or lower onto three points consisting of the center and two points located above and below on the porous oxide semiconductor layers inside each of the slits (lattices) of the first partition forming portions. At this time, a volatile electrolyte, having a volatile solvent composed of methoxyacetonitrile for the main solvent thereof and containing lithium iodide at 0.1 M, iodine at 0.05 M and 4-tert-butylpyridine at 0.5 M, was used as an electrolytic solution.

The abutting surface 52a of the first holding portion 51 and the abutting surface 62a of the second holding portion 61 were abutted to form a sealed space. After reducing the pressure within this sealed space to 800 Pa with a vacuum pump, the first partition forming portions and the second partition forming portions were superimposed within 10 seconds. The brass heater 66, having the heating surfaces 66a of a shape that matched the shape of the first partition forming portions, was then heated. The driving portion 57 composed of an oil pressure pump was driven, the holding member 55 was raised by raising the cylinder 56, and the partitions 15 were formed by heating and melting the first partition forming portions and the second partition forming portions at 160° C. while applying pressure of 3 MPa with the heating surfaces 66a of the heater 66. At this time, a bending portion was formed in the counter electrode 2 so as to protrude towards the working electrode 1 by the bending portion forming members 70.

Subsequently, the holding member 55 was lowered, the cell spaces were cooled, and the first holding portion and the second holding portion were separated. A dye-sensitized solar cell module was obtained in this manner.

Examples 2 and 3

Dye-sensitized solar cell modules were produced in the same manner as Example 1 with the exception of changing the thickness of the metal substrate that composes the counter electrode to the values shown in Table 1.

Examples 4 to 6

Dye-sensitized solar cell modules were produced in the same manner as Example 1 with the exception of using resin films composed of PEN, coated with a Ti film and having the thicknesses shown in Table 1 instead of the metal substrate that composes the counter electrode.

Comparative Examples 1 to 3

Dye-sensitized solar cell modules were produced in the same manner as Example 1 with the exception of changing the thickness of the metal substrate that composes the counter electrode to the values shown in Table 1.

Comparative Examples 4 to 6

Dye-sensitized solar cell modules were produced in the same manner as Example 1 with the exception of using resin films composed of PEN, coated with a Ti film and having the thicknesses shown in Table 1 instead of the metal substrate that composes the counter electrode.

[Evaluation of Changes in Photoelectric Conversion Efficiency]

Photoelectric conversion efficiency after 1000 hours was measured for the dye-sensitized solar cell modules obtained in Examples 1 to 6 and Comparative Examples 1 to 6, and then the time-based change in photoelectric conversion efficiency was calculated based on the following equation:

Time-based change in photoelectric conversion efficiency=Initial photoelectric conversion efficiency (100%)−photoelectric conversion efficiency after 1000 hours.

The results are shown in Table 1. Furthermore, cases in which the time-based change in photoelectric conversion efficiency was 5% or less were evaluated as "acceptable", while cases in which the time-based change in photoelectric conversion efficiency exceeded 5% were evaluated as "unacceptable".

TABLE 1

|  | Thickness of counter electrode metal substrate (μm) | Thickness of counter electrode resin film (μm) | Time-based change in photoelectric conversion efficiency (%) |
|---|---|---|---|
| Ex. 1 | 40 | — | 1 |
| Ex. 2 | 95 | — | 5 |
| Ex. 3 | 30 | — | 1 |
| Ex. 4 | — | 490 | 4 |
| Ex. 5 | — | 300 | 4 |
| Ex. 6 | — | 100 | 3 |
| Comp. Ex. 1 | 102 | — | 7 |
| Comp. Ex. 2 | 150 | — | 9 |
| Comp. Ex. 3 | 300 | — | 30 |
| Comp. Ex. 4 | — | 510 | 6 |

TABLE 1-continued

| | Thickness of counter electrode metal substrate (μm) | Thickness of counter electrode resin film (μm) | Time-based change in photoelectric conversion efficiency (%) |
|---|---|---|---|
| Comp. Ex. 5 | — | 600 | 7 |
| Comp. Ex. 6 | — | 1000 | 28 |

According to the results shown in Table 1, it was found that the dye-sensitized solar cell modules of Examples 1 to 6 demonstrated smaller time-based changes in photoelectric conversion efficiency in comparison with the dye-sensitized solar cell modules of Comparative Examples 1 to 6, and the rates of decrease in photoelectric conversion efficiency thereof were adequately low. Namely, the dye-sensitized solar cell modules of Examples 1 to 6 were acceptable with respect to time-based changes in photoelectric conversion efficiency. In contrast, the dye-sensitized solar cell modules of Comparative Examples 1 to 6 were unacceptable with respect to time-based changes in photoelectric conversion efficiency.

Accordingly, the present invention was confirmed to be able to realize a highly reliable dye-sensitized solar cell module.

EXPLANATION OF REFERENCE NUMERALS

1 working electrode (first electrode)
2 counter electrode (second electrode)
2a bending portion
3 electrolyte
8 porous oxide semiconductor layer (oxide semiconductor portion)
9 metal substrate
10 catalyst film (electrically conductive portion)
11 wiring portion
12 current collector wiring
15 partition
16 cell
100 dye-sensitized solar cell module
209 resin film
T1 metal substrate thickness
T2 resin film thickness

The invention claimed is:

1. A manufacturing method for a dye-sensitized solar cell module,
the method comprising:
a preparation step of preparing a pair of electrodes,
a partition forming portion fixing step of fixing partition forming portions containing a thermoplastic resin on at least one electrode of the pair of electrodes by heating and melting the partition forming portions, and
a lamination step of laminating the pair of electrodes via the partition forming portions with an electrolyte disposed between the pair of electrodes at a pressure of 50 Pa or more and less than 1013 hPa, and forming partitions that form a plurality of cell spaces together with the pair of electrodes between the pair of electrodes, the partitions being formed by heating and melting the partition forming portions and connecting the pair of electrodes, wherein,
one electrode of the pair of electrodes has a plurality of oxide semiconductor portions,
a dye loading step of loading a photosensitizing dye onto the oxide semiconductor portions is included between the preparation step and the partition forming portion fixing step,
a superimposing step of superimposing the pair of electrodes on at least one of which the partition forming portions are fixed is included between the partition forming portion fixing step and the lamination step,
the partition forming portion fixing step is performed before the superimposing step,
at least one electrode of the pair of electrodes is composed of at least two layers, the thickest layer being a metal substrate having a thickness of 10 μm or more and 40 μm or less,
in the lamination step, the pair of electrodes are laminated so that a bending portion that bends so as to protrude towards one of the cell space is formed in the electrode containing the metal substrate, the bending portion including the metal substrate, and
in the lamination step, the pair of electrodes are laminated so that the oxide semiconductor portion and the bending portion oppose one another in each of the cell spaces;
so that the electrolyte is accommodated in each of the cell spaces;
so that the partitions connect both the pair of electrodes; and
so that the plurality of cells, which are formed by the cell spaces, the partitions and the pair of electrodes, are connected in parallel.

2. The manufacturing method for a dye-sensitized solar cell module according to claim 1, wherein
at least one electrode of the pair of electrodes has a wiring portion containing a current collector wiring, and
in the lamination step, the partitions are formed so as to overlap the wiring portion.

3. The manufacturing method for a dye-sensitized solar cell module according to claim 1, wherein the metal substrate is composed of at least one type of metal selected from the group consisting of titanium, nickel, stainless steel and platinum, and the electrolyte contains iodine.

* * * * *